US012326324B1

(12) United States Patent
Rodgers, Jr.

(10) Patent No.: US 12,326,324 B1
(45) **Date of Patent: *Jun. 10, 2025**

(54) ILLUMINATING PROJECTILE

(71) Applicant: High Tactical, LLC, Tampa, FL (US)

(72) Inventor: Willard Thomas Rodgers, Jr., Tampa, FL (US)

(73) Assignee: High Tactical, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,588

(22) Filed: Oct. 13, 2023

Related U.S. Application Data

(63) Continuation of application No. 18/234,707, filed on Aug. 16, 2023, now Pat. No. 11,821,717.

(51) Int. Cl.
*F42B 12/38* (2006.01)
*F42B 8/12* (2006.01)
*F42B 8/18* (2006.01)
*F42B 12/40* (2006.01)
*F42B 12/42* (2006.01)
*H05B 47/105* (2020.01)

(52) U.S. Cl.
CPC ............ *F42B 12/38* (2013.01); *F42B 12/382* (2013.01); *F42B 12/40* (2013.01); *F42B 12/42* (2013.01); *F42B 8/12* (2013.01); *F42B 8/18* (2013.01); *H05B 47/105* (2020.01)

(58) Field of Classification Search
CPC .......... F42B 12/38; F42B 12/40; F42B 12/42; F42B 12/382; F42B 8/12; F42B 8/18
USPC .......................................................... 102/513
See application file for complete search history.

(56) References Cited

U.S. PATENT DOCUMENTS 3,810,426 A * 5/1974 Baker ...................... F42B 12/40 102/513
7,441,505 B1 * 10/2008 Rodgers, Jr. .......... F42B 12/382 102/513
7,900,619 B1 * 3/2011 Palmer .................... F42B 12/42 124/16
8,113,689 B2 * 2/2012 Mayo ...................... F42B 27/00 362/112
9,341,357 B2 * 5/2016 Hollinger .............. F21V 33/008
10,077,976 B2 * 9/2018 Wynn ..................... F21V 23/06
10,989,508 B2 * 4/2021 Rodgers, Jr. ............ F42B 12/42
11,118,881 B2 * 9/2021 Roper ..................... F42B 12/42
11,821,717 B1 * 11/2023 Rodgers, Jr. ............ F42B 12/40
12,188,754 B2 * 1/2025 Reynolds .................. F42B 8/18
2010/0285721 A1 * 11/2010 Ma ............................ F42B 8/12 446/485

(Continued)

*Primary Examiner* — James S Bergin
(74) *Attorney, Agent, or Firm* — Nicholas Pfeifer; Smith & Hopen, P. A.

(57) ABSTRACT

A projectile configured to illuminate upon impact with a target following a launch event. A launch sensor is configured to cause a processor to transition from a sleep state to a working state in response to a launch event. The processor then provides electrical power to an accelerometer. The accelerometer detects the rotation and/or the deceleration of the projectile to determine if the projectile has been launched, is rotating as expected, and has impacted an object within a predetermined time. Responsive to determining that the rotation and/or deceleration thresholds have been met, the processor is configured to provide electrical power to one or more of the plurality of illumination elements.

20 Claims, 10 Drawing Sheets

(56) References Cited

U.S. PATENT DOCUMENTS

| | | | | |
|---|---|---|---|---|
| 2013/0291755 | A1* | 11/2013 | Hirlinger | F42B 8/12<br>102/513 |
| 2018/0080748 | A1* | 3/2018 | Sotola | F42B 8/26 |
| 2022/0154892 | A1* | 5/2022 | Hall | F21V 23/0492 |
| 2024/0102777 | A1* | 3/2024 | Reynolds | F42B 8/18 |

* cited by examiner

ILLUMINATING PROJECTILE

CROSS-REFERENCE TO RELATED APPLICATIONS

This nonprovisional application is a continuation of and claims priority to nonprovisional application Ser. No. 18/234,707, entitled "ILLUMINATING PROJECTILE," filed Aug. 16, 2023 by the same inventor.

BACKGROUND OF THE INVENTION

1. Field of the Invention

This invention relates, generally, to projectiles. More specifically, it relates to a projectile configured to illuminate upon impact with a target.

2. Brief Description of the Prior Art

Illuminating projectiles, such as those previously conceived by the inventor of this present application, are known in the art. Known illuminating projectiles are configured to fulfill their intended objectives. However, the prior art designs suffer from a series of pitfalls which have been overcome by the present invention. Specifically, prior art illuminating projectiles were designed to detect an initial force imparted onto the projectile and initiate a timer in response thereto. At the predetermined time following the force detection, the projectiles illuminate.

These devices, however, are susceptible to detection of unintentional forces. For example, when the prior art devices are dropped, the timer is initiated, and the projectiles illuminate after a predetermined time. If the illumination is undetected, the battery could be completely drained leaving the device useless without any indication to a future user.

These devices also tend to use sensors systems that are constantly consuming power to ensure that the device is ready to detect a launch. Again, this approach results in undesirable battery drainage.

Accordingly, what is needed is an improved illuminating projectile configured to properly identify a launch event without unnecessarily draining the battery. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved illuminating projectile configured to properly identify a launch event without unnecessarily draining the battery is now met by a new, useful, and nonobvious invention.

The projectile is configured to illuminate upon impact with a target following a launch event. The projectile includes an illumination assembly having a plurality of illumination elements, a processor having a sleep state and a working state, a battery configured to provide electrical power to the processor, and a piezoelectric sensor configured to cause the processor to transition from the sleep state to the working state in response to a launch force or acceleration. In some embodiments, the piezoelectric sensor is configured to flex in response to a launch event and in turn send a signal to the processor when the launch force or acceleration meets a predetermined threshold. The signal causes the processor to transition from the sleep state to the working state. In some embodiments, the predetermined launch force is between 7,000 and 120,000 G-forces. In some embodiments, the predetermined launch force is between 30,000-80,000 G-forces. In some embodiments, the predetermined launch acceleration is between 100 and 400 FPS.

The projectile further includes memory. The memory can be a component of the processor or a separate component in communication with the processor. The memory includes instructions that, when executed by the processor, cause the processor to provide electrical power to an accelerometer. The accelerometer detects the rotation and/or the deceleration of the projectile. Thus, some embodiments of the processor are configured to determine whether the accelerometer detects a rotation that meets a predetermined rotation threshold and/or a deceleration that meets a predetermined deceleration threshold. These thresholds indicate that the projectile has been launched, is rotating as expected, and has impacted an object. The rotation threshold can be between 20-100 RPS or 1200-6000 RPM, and the deceleration threshold can be 50% of its launch acceleration. In some embodiments, the deceleration threshold is met if the acceleration or speed of the projectile reaches a value of 0.

Some embodiments include instructions that cause the processor to enter the sleep state without providing electrical power to the accelerometer and the plurality of illumination elements if the rotation threshold and the deceleration thresholds are not met within a predetermined timeframe. Responsive to determining that the rotation and/or deceleration thresholds have been met, the processor is configured to provide electrical power to one or more of the plurality of illumination elements.

In some embodiments, the processor cuts the power to the plurality of illumination elements after a predetermined time. In some embodiments, the projectile includes a magnetic sensor configured to detect the presence of a magnetic field and, in response to detecting a magnetic field, cause the processor to enter the sleep state and reduce or eliminate the electrical power to the accelerometer and the plurality of illumination elements.

The projectile further includes an outer housing having a first end, second end, and sidewall extending between the first wall and second wall. At least a portion of the outer housing is transparent, and the illumination assembly resides within the outer housing. In some embodiments, the outer housing is waterproof and buoyant.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
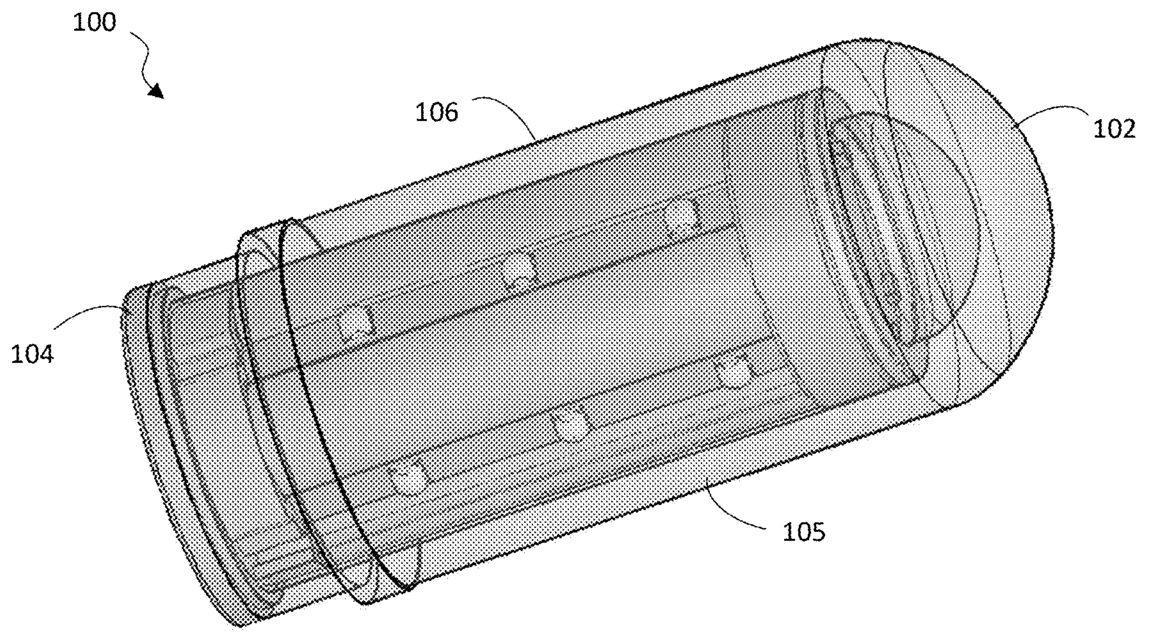
FIG. 1 is a perspective view of an embodiment of the present invention.
Figure 2:
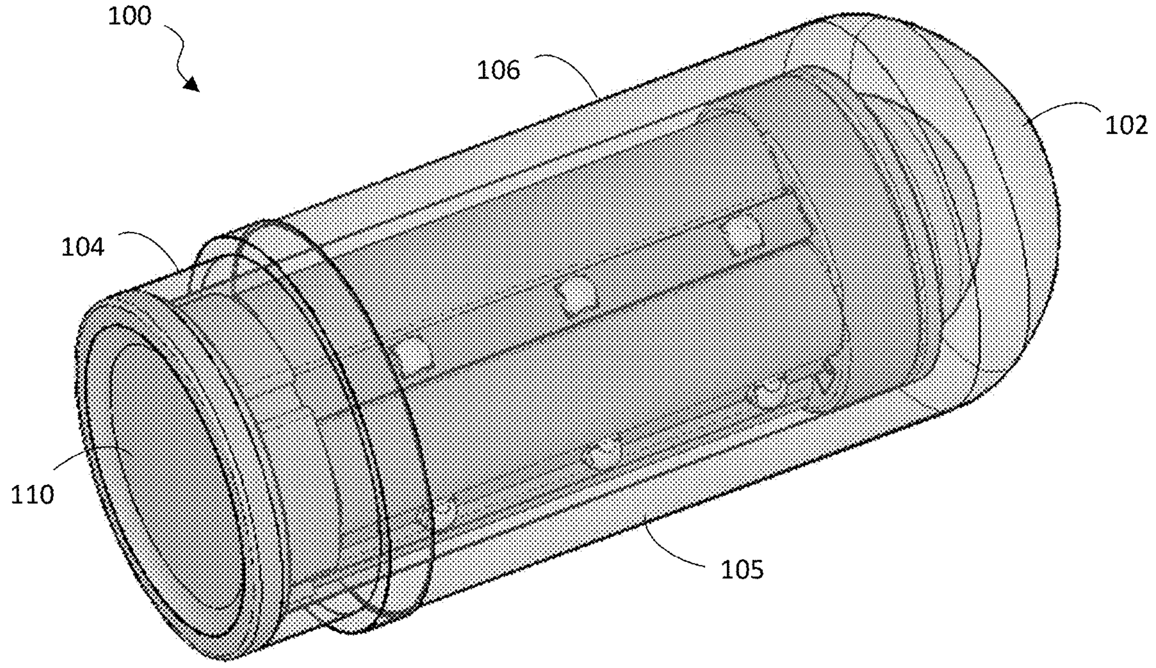
FIG. 2 is a rear perspective view of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer or other electronic devices to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention includes illumining projectile 100. In some embodiments, projectile 100 is configured to be launched from a firearm. Such embodiments include a casing having primer and propellant. The casing can be formed of a cylindrical side wall with a rear end having a base and an open front end configured to receive projectile 100. The casing, propellant, and primer can be any known in the art, such as those typically used to launch grenades.

Projectile 100 includes an outer housing 105 comprised of a first, generally forward end 102; a second, generally rear end 104; and outer sidewall 106 extending generally between first and second ends 102, 104. First end 102 has a generally frustoconical shape extending forwardly from sidewall 106 and terminating at forward concave area. However, first end 102 may have alternative shapes, such as those known to reduce drag during flight.

First end 102 is comprised of a material sufficient to withstand the impact forces associated with projectile 100 hitting a solid surface after being discharged from a firearm. For example, first end 102 may be fabricated of resilient elastomeric materials selected from the class of elastomeric materials including silicone, rubber, vinyl, or other elastically resilient materials. Some embodiments include resilient cushioning ring 111 between first end 102 and illumination assembly 112 to further protect the device from the impact forces associated with projectile 100 hitting a solid surface.

Rear end 104 includes a generally circular base structure 110 leading to sidewall 106, which has a generally cylindrical shape. Rear end 104 is subject to the explosive forces of the propellant upon firing of the weapon. Thus, rear end 104 is comprised of materials known in the art that are capable of withstanding such forces.

Sidewall 106 can be comprised of a single wall or comprised of a plurality of interconnected walls to form a cylindrical outer surface. One skilled in the art would recognize that cylindrical sidewall 106 and circular base structure 110 can be any geometric configurations configured to allow for operation with a firearm.

Sidewall 106 is also fabricated of a transparent rigid material selected from the class of transparent rigid materials including plastic, polycarbonate, or other rigid thermoplastic polymers. In some embodiments, front end 102 and/or rear end 104 are also fabricated of a transparent material.

Figure 3:
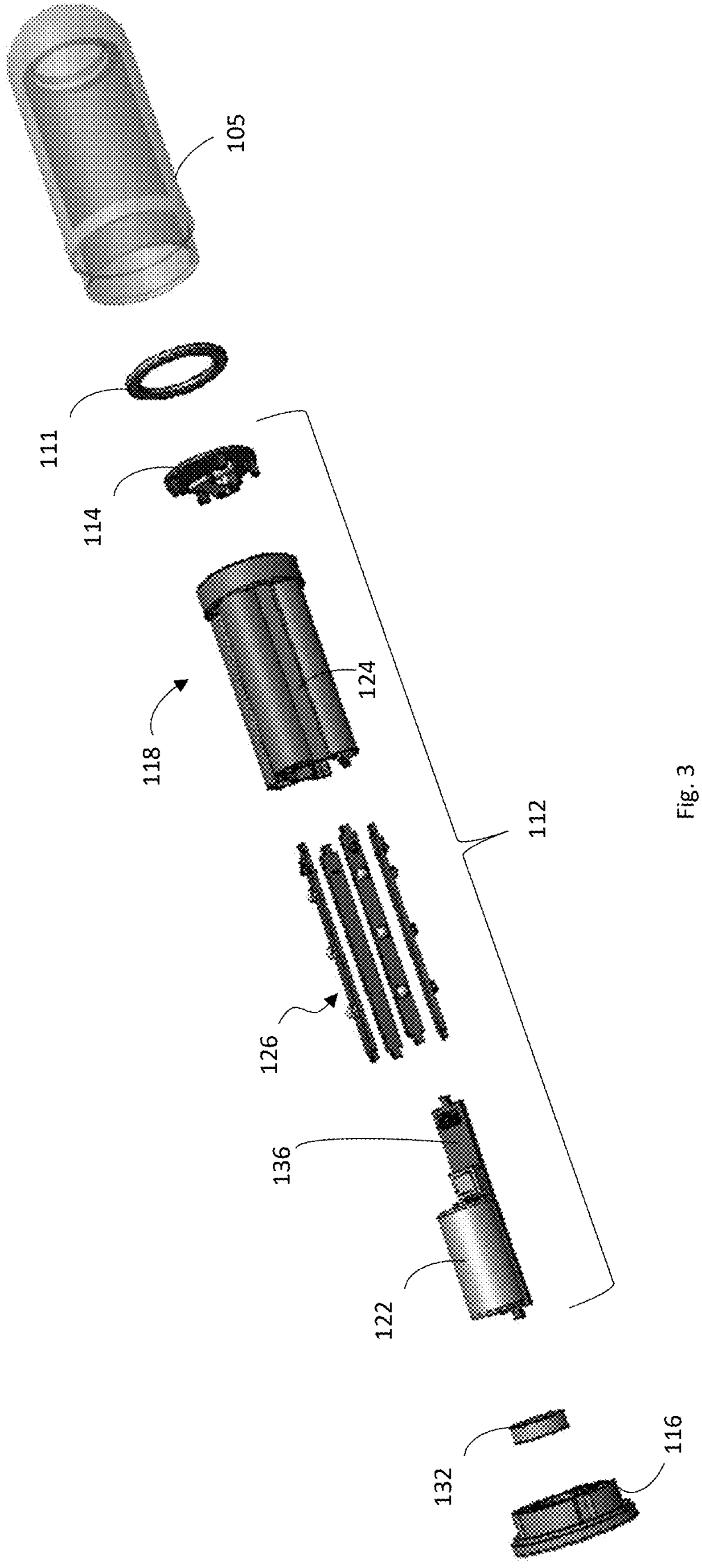
FIG. 3 is an exploded view of an embodiment of the present invention.
Figure 4:
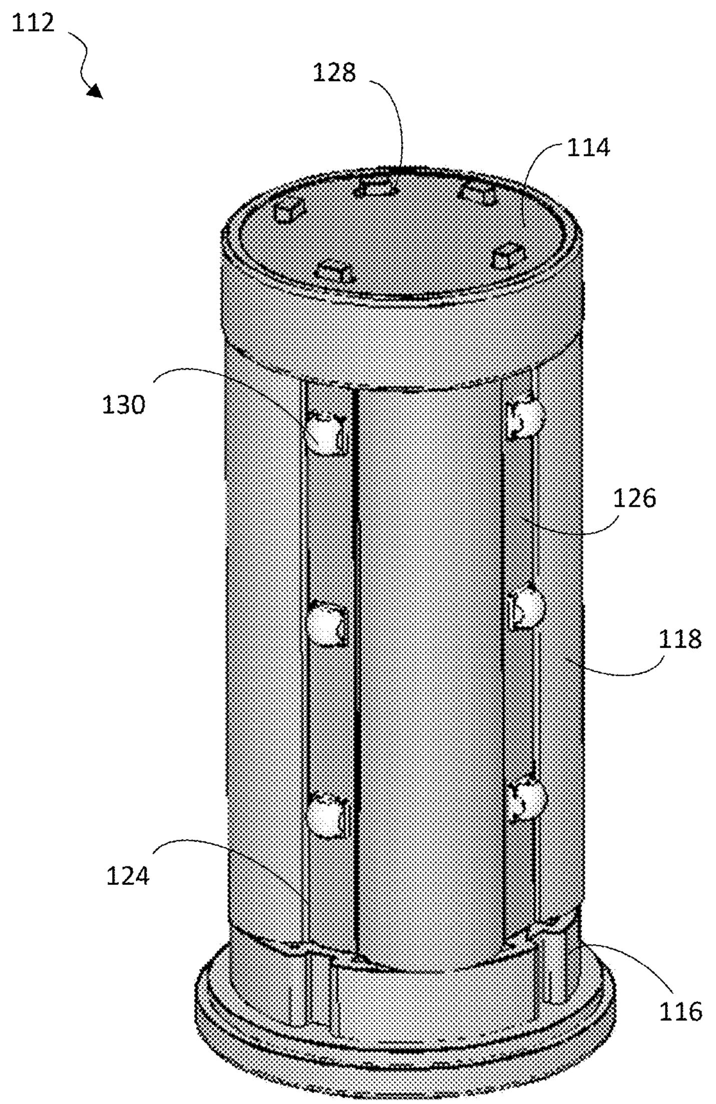
FIG. 4 is a top perspective view of an embodiment of the present invention depicting the support structure and illumination assembly.
Figure 5:
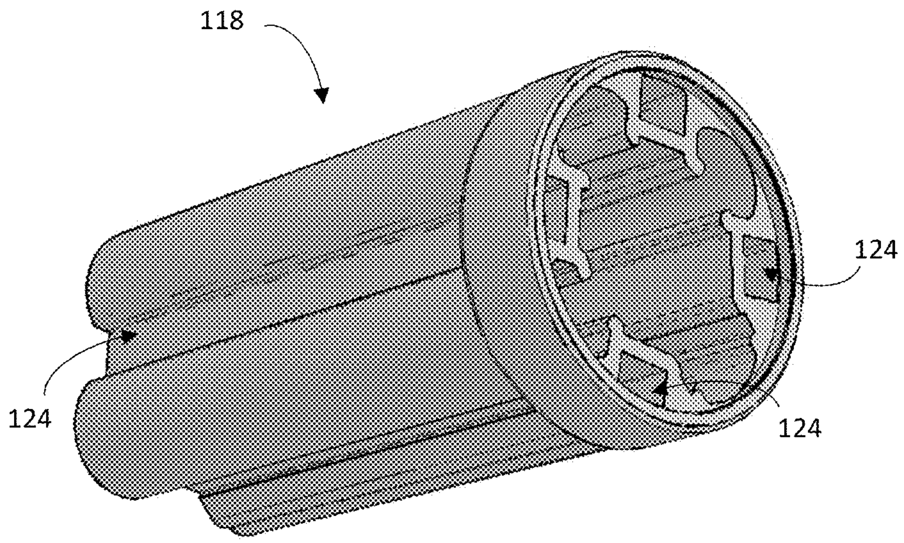
FIG. 5 is a perspective view of an embodiment of the support structure.
Figure 6:
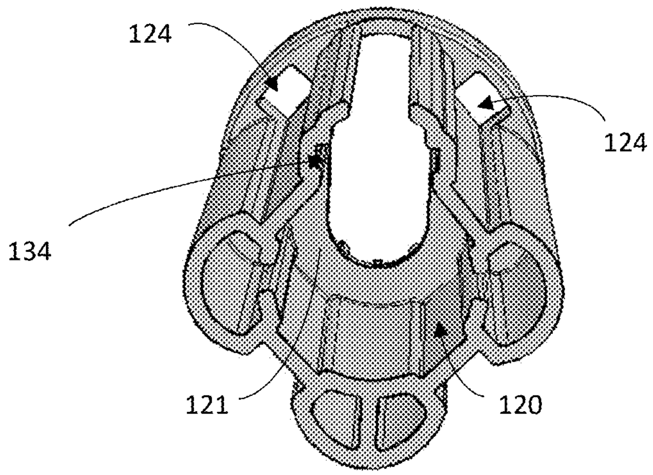
FIG. 6 is a rear perspective view of an embodiment of the support structure.
Figure 7:
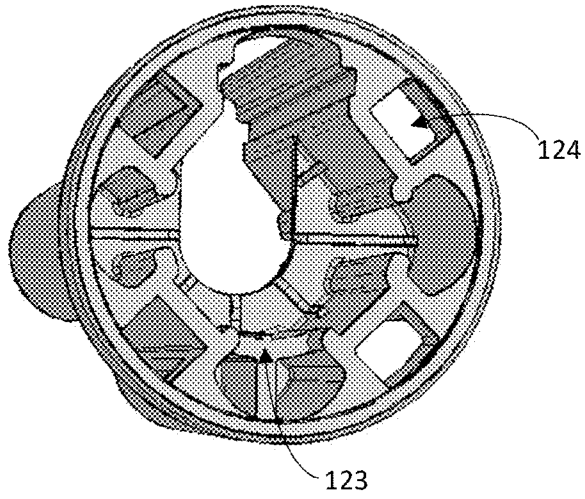
FIG. 7 is a front view of an embodiment of the support structure.

Referring now to FIGS. 3-4, projectile 100 further includes illumination assembly 112 residing within the outer housing 105. Illumination assembly 112 includes first end cap 114, second end cap 116, and one or more structural supports 118 extending therebetween. End caps 114, 116 may be comprised of printed circuit boards (PCB) to house electronic components or may be comprised of a rigid material, known in the art, to enhance the structural rigidity of the assembly 112. End caps 114, 116 are also secured to outer housing 105 (e.g., through ultrasonic welding) to prevent rotation of illumination assembly 112 relative to outer housing 105. In some embodiments, second end cap 116 may be temporarily secured to allow battery 120 to be replaced. The temporary attachment may be achieved using known mechanisms and methods, such as threaded connections.

In some embodiments, second end cap 116 is integrated with or a component of circular base structure 110. In such embodiments, second end cap 116 may be comprised of the same rigid materials of base structure 110 to enhance rigidity. Alternatively, the material compositions between second end cap 116 and base structure 110 may vary.

Structural support(s) 118 may be of a single piece construction or comprised of a plurality of interconnected structural supports. Hereinafter, the one or more structural supports 118 will be referred to as a single structural support having various components. Structural support 118, which is best depicted in FIGS. 4-7, is configured to provide additional rigidity to illumination assembly 112, establish battery chamber 120 for battery 122, and establish backstop 123 for launch sensor 148. Structural support 118 may be secured to end caps 114, 116 and/or outer housing 105.

Figure 8:
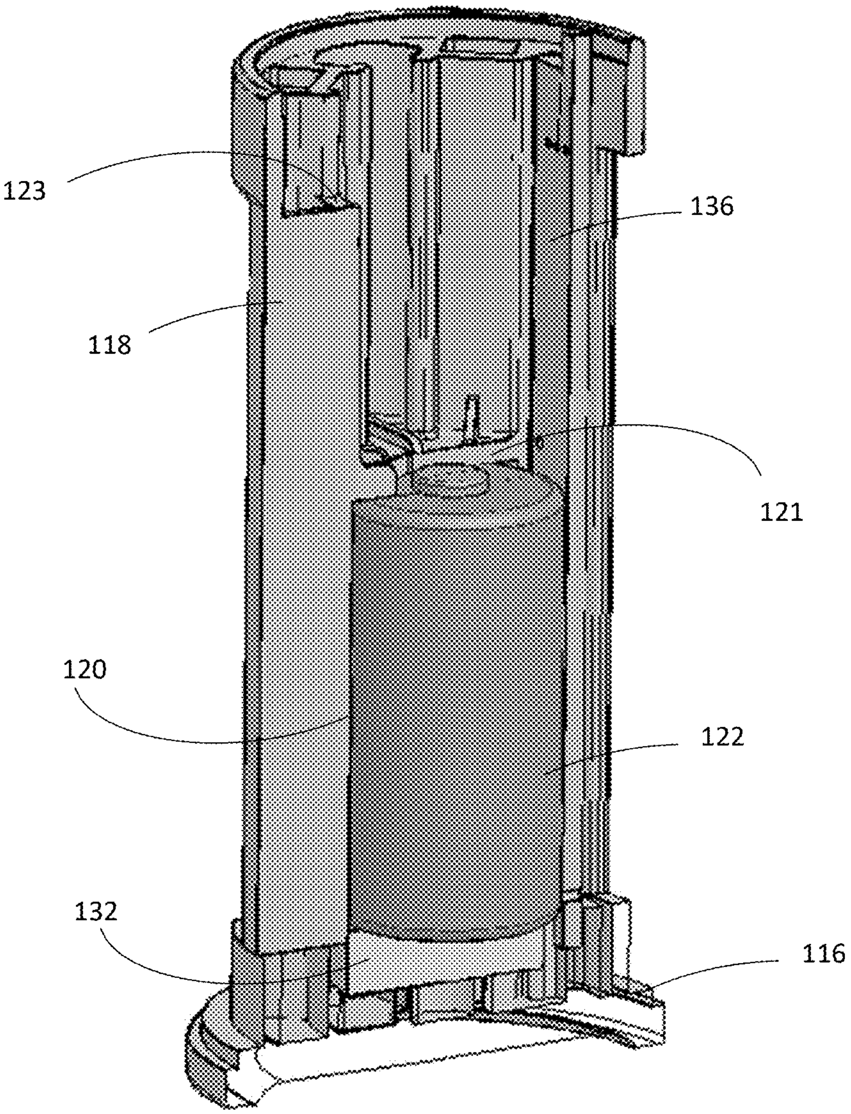
FIG. 8 is a sectional view of an embodiment of the support structure showing the location of the battery within the support structure.

As best depicted in FIG. 8, battery chamber 120 is established by the interior sidewalls of structural support 118, upper retention wall 121 and second end cap 116; and provides a secure housing to minimize movement of battery 122 within chamber 120. Some embodiments further include a cushioning member 132 located between battery 122 and second end cap 116 to protect battery 122 during launch and to limit axial translation of battery 122 within battery chamber 120 (see FIGS. 3 and 8).

Figure 9:
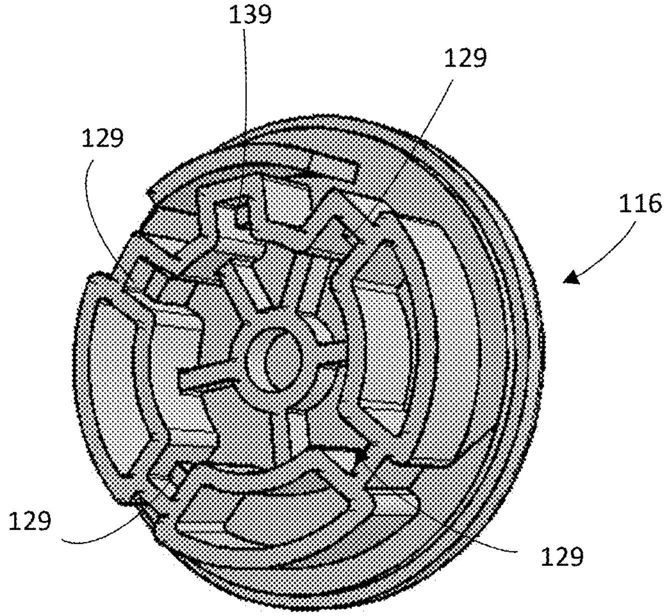
FIG. 9 is a perspective view of an embodiment of the bottom end cap.

Referring back to FIGS. 4-7, in some embodiments, structural support 118 includes receipts 124 configured to receive and retain illumination support members 126. Receipts 124 may be equidistantly spaced about the circumference of structural support 118 to ensure that light can be emitted from various sides of projectile 100. Receipts 124 are also longitudinally aligned with apertures 128, 129 in ends caps 114, 116 (see FIGS. 9-10). Apertures 128, 129 receive the respective ends of illumination support members 126 to enhance rigidity and prevent rotation of illumination support members 126 relative to end caps 114, 116.

Illumination support members 126 provide the foundation on which illumination elements 130 (e.g., LEDs) are secured to illumination assembly 112. Illumination support members 126 may be comprised of PCB thereby providing the necessary electrical connections to the illumination elements 130. In some embodiments, illumination support members 126 may be comprised of known rigid materials to enhance the structural rigidity of the assembly and additional electrical components can be used to provide the necessary connections between illumination elements 130 and the other components of the illumination assembly 112.

Each illumination support member 126 includes one or more illumination elements 130. Some embodiments include three illumination elements 130 on each illumination support member 126 to maximize illumination with the minimum number of illumination elements 130 drawing power. However, more or less illumination elements may be used.

Moreover, illumination elements can be LEDs, or any other known devices configured to emit light waves. In some embodiment, illumination elements 130 emit light having a wavelength on the visible spectrum. In some embodiments, illumination elements 130 emit light that falls within the non-visible spectrum, such as ultraviolet light and infrared light. In addition, all, or a subset of illumination elements 130 may be configured to emit light at different wavelengths to provide varying functionality.

Referring back to FIGS. 3-8, structural support 118 further includes receipt 134 for circuit board 136. Like illumination support member 126, circuit board 136 extends through apertures 138, 139 in ends caps 114, 116 to enhance rigidity and prevent rotation of circuit board 136 relative to end caps 114, 116. Furthermore, circuit board 136 may be a rigid support structure comprised of known rigid materials to enhance the structural rigidity of the assembly while also including the necessary electrical components to provide the connections between the various components of the illumination assembly 112.

Figure 11:
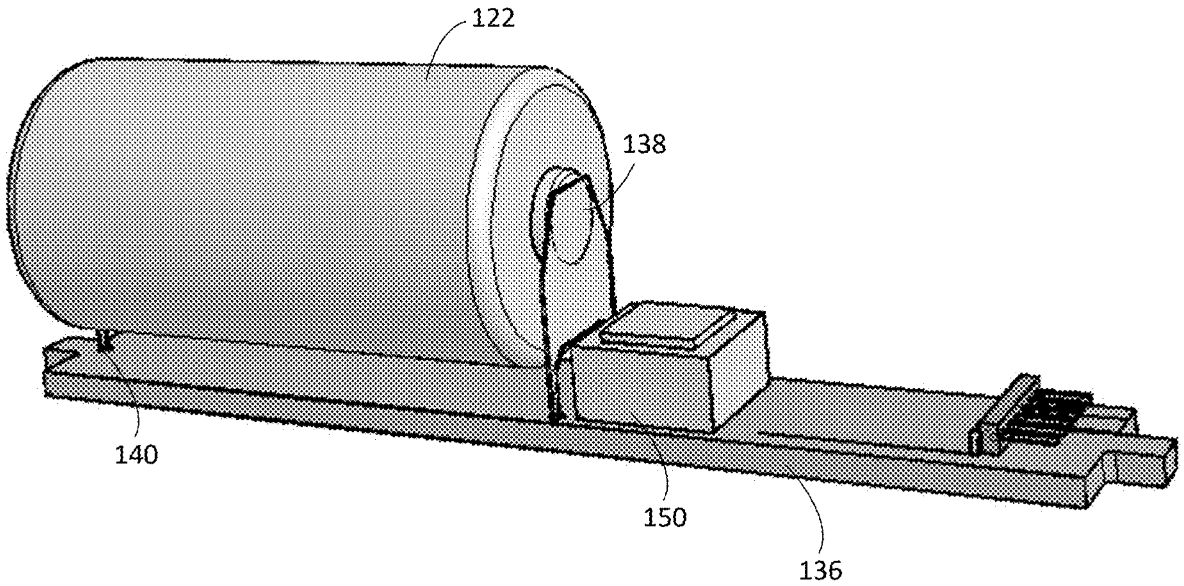
FIG. 11 is side perspective view of an embodiment of the circuit board of the illumination assembly.

Circuit board 136 houses at least some of the illumination circuitry and is in electrical communication with battery 122. In some embodiments, as depicted in FIG. 11, circuit board 136 includes positive and negative terminals 138, 140. Through these terminals, circuit board 136 receives power from battery 122, which can be directed to other components. More specifically, circuit board 136 is in electrical communication with illumination elements 130, processor 142, launch/piezoelectric sensor 144, impact sensor/accelerometer 146, and timer 147. In some embodiments, one or more of these components are secured to circuit board 136 by using surface mount pads with pins extending through the PCB, which are soldered to the board on the opposite surface of circuit board 136 to ensure that the components remain in place during a launch event.

Figure 12:
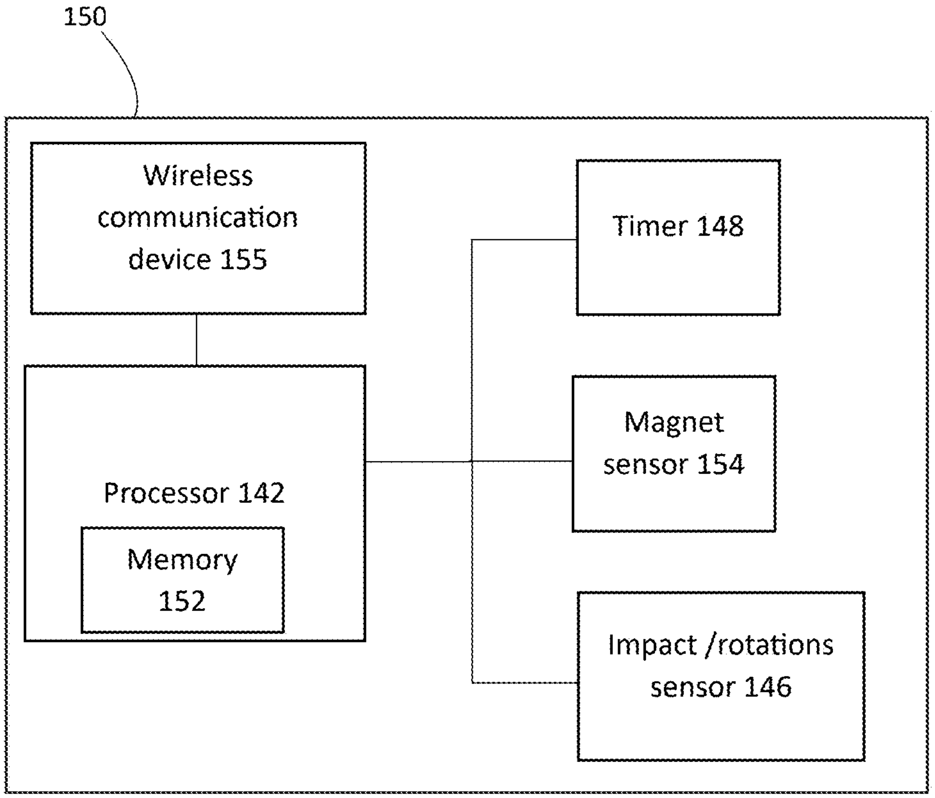
FIG. 12 is a block diagram of an embodiment of the component housing.

To reduce clutter in the figures, circuitry housing 150 is depicted as housing processor 142, impact sensor/accelerometer 146, wireless communication device 155, and timer 147 as provided in the block diagram of FIG. 12. However, each component can be secured to circuit board 136 outside of housing 150 or to another portion of illumination assembly 112.

Processor 142 can include internal or external memory 152 and an internal or external timer 147. Processor 142, through memory 152 includes a set of instructions to govern the operation of processor 142 and the various interconnected components. In addition, processor 142 is designed to have a sleep state and a wake/working state. During the sleep state, processor 142 consumes minimal to no power.

During the working state, processor 142 is configured to access/communicate with memory 152 and timer 147 and communicate with illumination elements 130, impact sensor 146 and/or any other components employed by projectile 100 in accordance with the instructions stored in memory 152.

Figure 13:
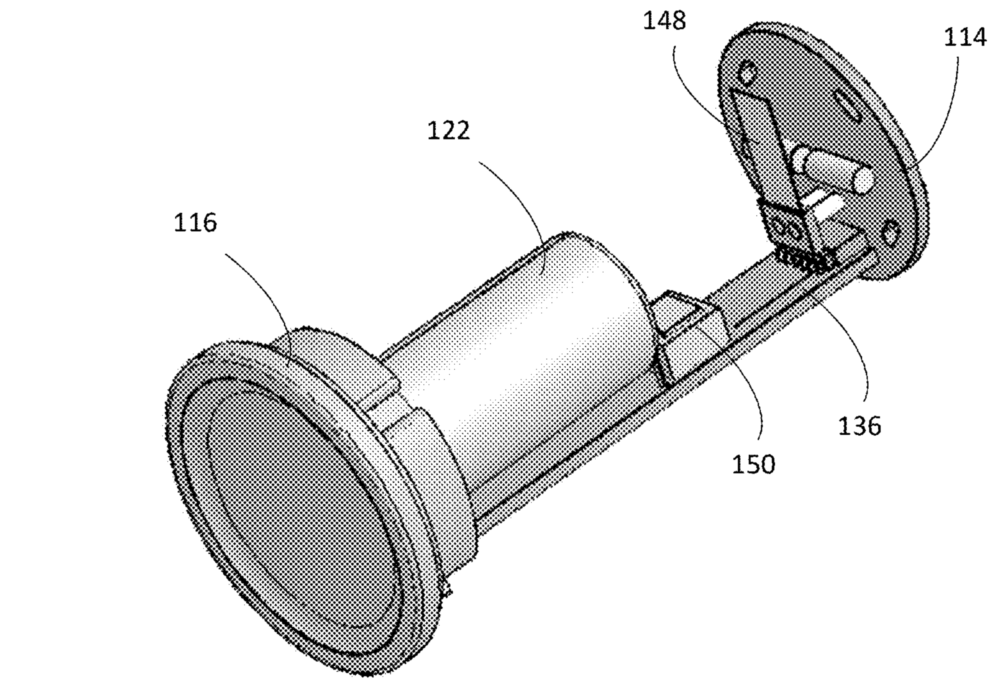
FIG. 13 is a bottom perspective view of an embodiment of a portion of the illumination assembly showing the interconnection of the circuit board with the end caps.

Circuit board 136 is also in electrical communication with launch sensor 148 as shown in FIG. 13. In the depicted embodiment, launch sensor 148 is secured to end cap 114. However, launch sensor 148 can be secured in other locations in other embodiments.

Figure 14:
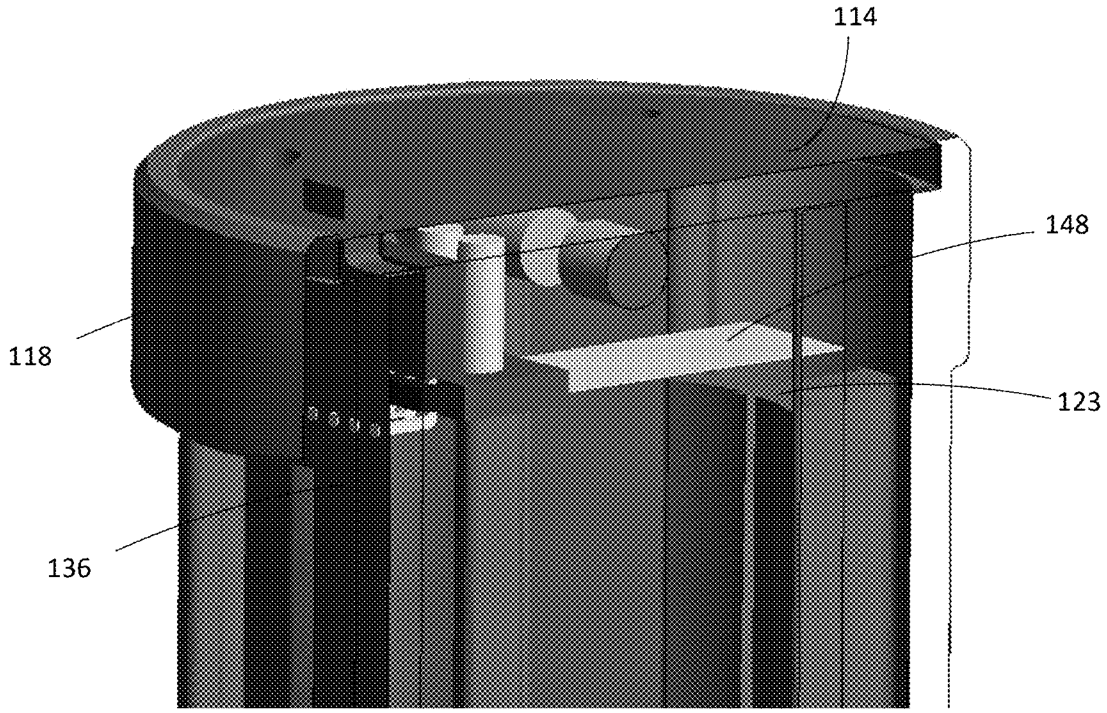
FIG. 14 is a sectional view of an upper section of an embodiment of the present invention.

In some embodiments, launch sensor 148 is a piezoelectric sensor configured to flex in response to a launch event and, as result of the flexion, launch sensor 148 sends a signal to processor 142 to wake processor 142 from its sleep state and then turn on one or more components. As best depicted in FIG. 14, launch sensor 148 is positioned to ensure that launch sensor 148 will contact backstop 123 during a launch event to prevent the significant forces from flexing launch sensor 148 beyond its elastic limit. Some embodiments further include cushions on either sides of launch sensor 148 to ensure that flexing in either direction does not damage launch sensor 148.

Some embodiments of launch sensor 148 are configured to send the wake signal to processor 142 only when the forces imposed on launch sensor 148 exceed a predetermined threshold. For example, some embodiments may be designed to be launched from a firearm. Using a predetermined force threshold (i.e., "trip force threshold") ensures that a launch event will be properly distinguished from non-launch forces that might be imposed on projectile 100, such as an accidental dropping of projectile 100. In some embodiments, the threshold is 10 times the force of gravity. In other words, launch sensor 148 will only send a wake signal to processor 142 when launch sensor 148 detects a force that is 10 times the force of gravity.

From another perspective, some embodiments detect a launch event by the output voltage of launch sensor 148. For example, a voltage threshold for detecting a launch event can be set to 50,000 millivolts and processor 142 can be configured to turn on when it receives at least 50,000 millivolts, which can be referred to as the "trip voltage threshold."

As noted above, processor 142 is configured to communicate with impact sensor 146. Impact sensor 146 may be any sensor adapted to detect changes in acceleration using any known methods for doing so. A non-limiting example of such a sensor is an accelerometer. In some embodiments, impact sensor 146 is configured to detect the rotation of projectile 100 and/or the change in acceleration when projectile 100 impacts a target or nearby object. As with launch sensor 148, impact/rotation sensor 146 may be secured to circuit board 136 inside or outside of housing 150 or at any other locations within projectile 100 so long as impact/rotation sensor 146 is in communication with the one or more other electrical components of projectile 100.

Instructions of Processor 142

Figure 15:
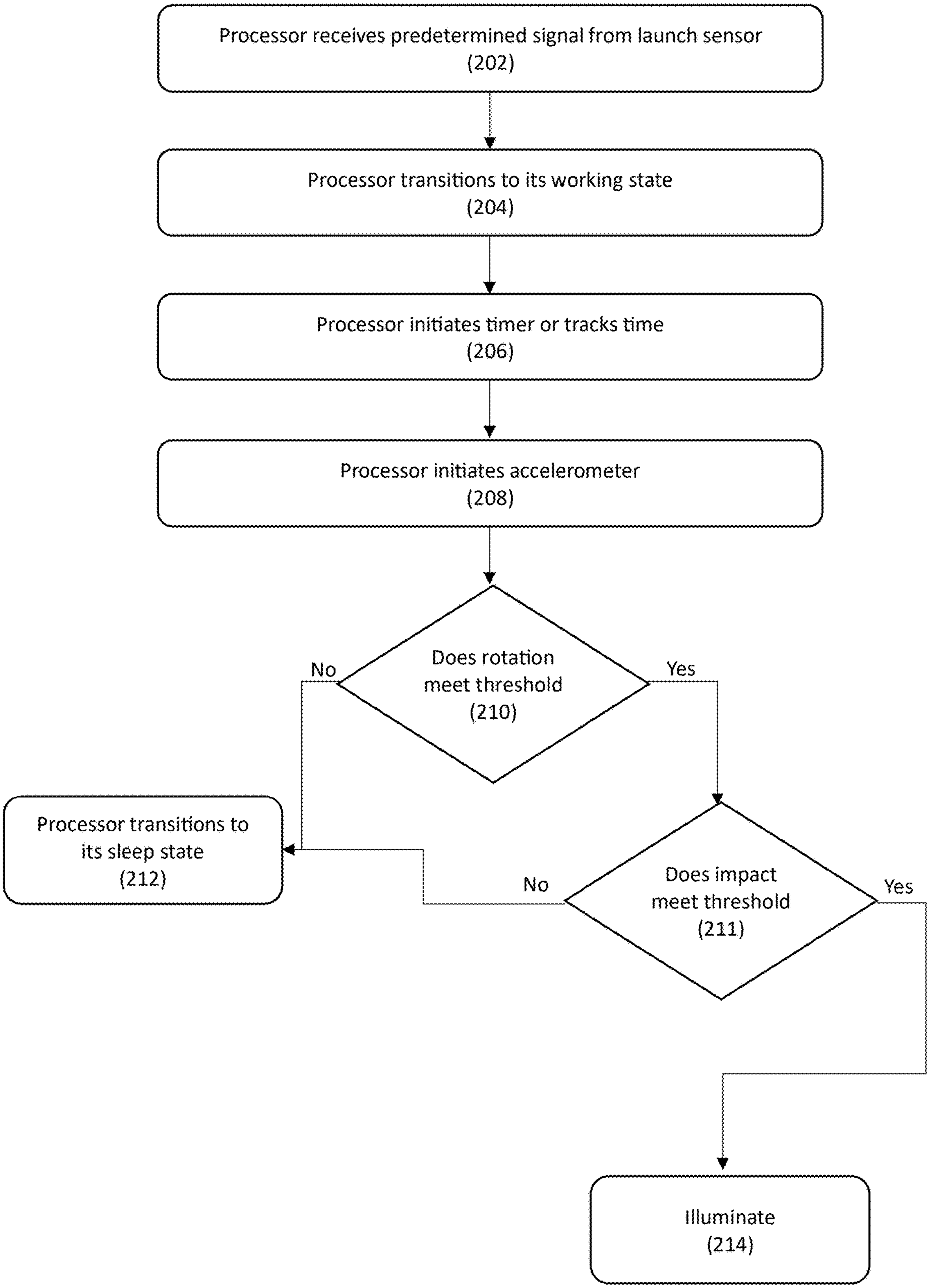
FIG. 15 is a flowchart of an embodiment of the instructions stored in memory.

Referring now to FIG. 15, processor 142 is configured to operate in accordance with instructions stored in memory 152. Because processor 142 is in sleep mode (i.e., reduced power mode) in its default state, the active operation of processor 142 starts with step 202 in which processor 142 receives a predetermined signal from launch sensor 148. As noted above, the predetermined signal can be a trip voltage meeting or exceeding a predetermined threshold. Responsive to receiving the predetermined signal, processor 142 enters its working state at step 204. Processor 142 also begins tracking time or initiates timer 147 at step 206. At step 208, processor 142 also turns on accelerometer 146. It should be noted that steps 206 and 208 can occur simultaneously or step 208 can occur before step 206. In addition, steps 204-208 can occur generally at the same time.

Processor 142 is in communication with impact/rotation sensor 146 and is configured to determine whether sensor 146 detects the expected launch rotation and/or impact of projectile 100 within a predetermined time. In some embodiments, sensor 146 can detect a rotation and/or an impact that meets a predetermined respective threshold to associate the detection with a launch and an impact within the predetermined time. In some embodiments, sensor 146 must detect a rotation and an impact that meets the predetermined respective thresholds to associate the detection with a launch and an impact within the predetermined time. Accordingly, some embodiments include instructions to determine whether the rotation of projectile 100 meets or exceeds a predetermined rotation threshold at step 210 within a predetermined time. Some embodiments additionally or alternatively include step 211 to determine whether projectile 100 meets or exceeds a predetermined impact force or acceleration within a predetermined time. If sensor 146 does not detect the rotation threshold or impact threshold within the predetermined time, processor 142 powers down the components and enters its sleep state at step 212.

In some embodiments, the predetermined time is one minute or less. In some embodiments, the rotation threshold is between 20-100 RPS or 1200-6000 RPM. In some embodiments, the impact threshold is measured by a 50% or greater reduction in speed or acceleration. In some embodiments, the impact threshold is a measured acceleration or speed of zero.

If sensor 146 detects that projectile 100 has met the necessary rotation and/or necessary impact, processor 142 powers on illumination elements 130 at step 214. In some embodiments, processor 142 will continue to power illumination elements 130 for a predetermined time or until projectile 100 is turned off. Projectile 100 may be turned off through an external switch, through a wireless communication system, and/or through magnetic sensor disposed in projectile 100.

Accordingly, some embodiments of projectile 100 include magnet sensor 154 in communication with processor. Magnet sensor 154 can reside within housing 150 or elsewhere in projectile 100. Magnet sensor 154, e.g., a hall effect sensor, is adapted to detect the presence of a threshold magnetic force within a predetermined distance from magnet sensor 154. When magnet sensor 154 detects the presence of a magnetic force, such as one from a disarming magnet key, processor 142 turns off the power to the various components and enters its sleep state. This approach ensures that the device cannot be switched off without the proper key.

Similarly, projectile 100 could further include wireless communication device 155 in communication with processor 142 and/or any of the other components within projectile 100. Wireless communication device 155 may be any communication device including but not limited to a radio frequency receiver, Wi-Fi wireless module, Bluetooth module, or other wireless transceiver. Wireless communication device 155 is configured to detect transmitted signals sent remotely from a corresponding controller to wirelessly control one or more of the components of projectile 100, e.g., activating and deactivating illumination elements 130. Wireless communication device 155 could also be used to change the operation of illumination elements 130. For example, illumination elements 130 may be adapted to strobe, illuminate in patterns, change wavelengths, change colors, etc.

Figure 10:
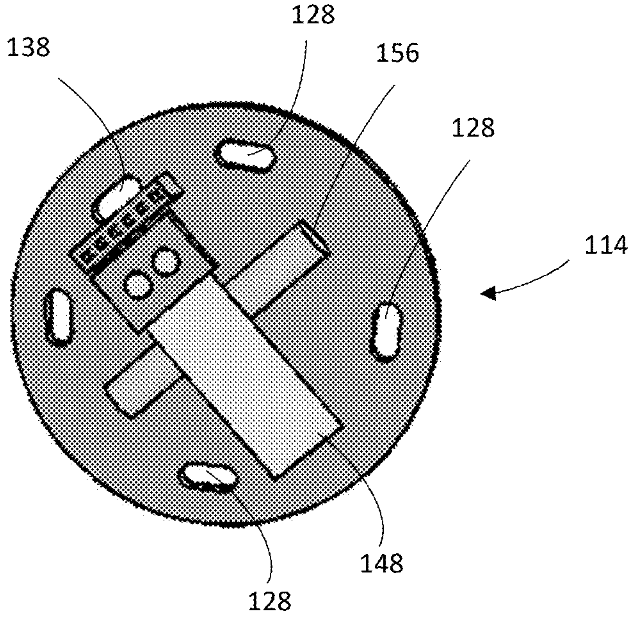
FIG. 10 is a perspective view of an embodiment of the top end cap.

Some embodiments further include tilt sensor 156 as shown in FIG. 10. Tilt sensor 156 is adapted to detect rotation of projectile 100 and can do so to identify a launch event should launch sensor 148 fail to detect the launch event. Tilt sensor 156 can also operate as a backup rotational sensor if impact/rotation sensor 146 fails.

In some embodiments, processor 142 is further configured to capture and store data associated with the operation of projectile 100. Projectile 100 can further include a wired connection or a wireless transmitter for uploading the data to a computer or external data store.

In some embodiments, at least a portion of projectile 100 is waterproof and comprised of buoyant materials for allowing buoyancy when projected into a large body of water such as oceans or lakes for illumining, marking, and identifying areas from aerial distances. Some embodiments, further include a flare mode, in which illumination elements 130 are configured to emit a bright red light similar to a flare. With an external switch or through wireless communication device 155, a user can set projectile 100 to operate as a flare upon detection of a launch event or upon actuation using a controller.

Projectile 100 can further include a throw mode. The throw mode either reduces the threshold force detection of launch sensor 148 or eliminates step 202 and proceeds to step 204. Using an external switch or wireless communication device 155, a user can set projectile 100 to throw mode, which allows for functionality in response to throwing projectile 100.

Projectile 100 can also include one or more speakers and/or microphones to allow for the transmission of sound waves to and/or from projectile 100. Some embodiments are configured to operate as an artificial concussion grenade. Using an external switch or wireless communication device 155, a user can set projectile 100 to emit an explosive sound and a blinding flash of light similar to a concussion grenade upon detection of an impact following a launch or a throw event or at a user's preference using a controller.

Some embodiments include one or more taser/charge elements secured to outer housing 105. Using an external switch or wireless communication device 155, a user can set projectile 100 to electrify the charge elements upon detection of an impact following a launch or a throw event or at a user's preference using a controller.

Some embodiments include one or more gas discharging elements configured to expel gas or smoke to an external environment. Using an external switch or wireless communication device 155, a user can set projectile 100 to emit the stored gas upon detection of an impact following a launch or a throw event or at a user's preference using a controller.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A projectile configured to illuminate upon following a launch event, comprising:
- an outer housing having a first end, second end, and sidewall extending between the first end and second end;
- an illumination assembly residing within the outer housing, the illumination assembly including:
  - a plurality of illumination elements configured to project light waves to an ambient environment beyond the outer housing;
  - a processor having a sleep state and a working state;
  - a battery configured to provide electrical power to the processor;
  - a launch sensor, the launch sensor configured to:
    - detect a launch force;
    - send a signal to the processor when the launch force meets a predetermined threshold, wherein the signal causes the processor to transition from the sleep state to the working state;
  - memory including instructions that cause the processor to provide electrical power to one or more of the plurality of illumination elements when a sensor detects an impact force that meets a threshold force, a rotation that meets a threshold rotation value, or an acceleration that meet a threshold acceleration value.

2. The projectile of claim 1, wherein the memory is a component of the processor.

3. The projectile of claim 1, wherein the outer housing is waterproof and buoyant.

4. The projectile of claim 1, further including a magnetic sensor, the magnetic sensor configured to:
- detect the presence of a magnetic field; and
- in response to detecting a magnetic field, cause the processor to enter the sleep state and reduce or eliminate the electrical power to the plurality of illumination elements.

5. The projectile of claim 1, further including an accelerometer, wherein the instructions cause the processor to enter the sleep state without providing electrical power to the plurality of illumination elements if the accelerometer detects that a rotation threshold and a deceleration threshold are not met within a predetermined timeframe.

6. The projectile of claim 5, wherein the rotation threshold is between 20-100 RPS or 1200-6000 RPM.

7. The projectile of claim 5, wherein the deceleration threshold is a 50% reduction in speed or acceleration.

8. The projectile of claim 1, wherein the predetermined threshold of the launch force is between 7,000 and 120,000 G-forces.

9. A projectile configured to illuminate upon impact with a target following a launch event, comprising:
- an illumination assembly, the illumination assembly including:
  - a plurality of illumination elements;
  - a processor having a sleep state and a working state;
  - a battery configured to provide electrical power to the processor;
  - a launch sensor configured to detect a launch event and, in response to detecting a launch event, send a signal to the processor to cause the processor to transition from the sleep state to the working state;
  - memory including instructions that instruct the processor to provide electrical power to one or more of the plurality of illumination elements when a sensor detects an impact that meets a force threshold, a rotation that meets a threshold rotation value, or an acceleration that meet a threshold acceleration value.

10. The projectile of claim 9, further including an outer housing having a first end, second end, and sidewall extending between the first end and second end, wherein at least a portion of the outer housing is transparent, and the illumination assembly resides within the outer housing.

11. The projectile of claim 9, further including a magnetic sensor, the magnetic sensor configured to:

detect the presence of a magnetic field; and in response to detecting a magnetic field, causing the processor to enter the sleep state and reduce or eliminate the electrical power to the plurality of illumination elements.

12. The projectile of claim 9, wherein the instructions cause the processor to enter the sleep state without providing electrical power to the plurality of illumination elements if an accelerometer detects that a rotation threshold and a deceleration threshold are not met within a predetermined timeframe.

13. The projectile of claim 9, wherein the launch event occurs when a launch force is greater than 7,000 G-forces.

14. The projectile of claim 9, wherein the instructions provided in memory further cause the processor to:

provide electrical power to an accelerometer;

determine whether the accelerometer detects a rotation above a predetermined rotation threshold;

determine whether the accelerometer detects a deceleration above a predetermined deceleration threshold indicating that the projectile has impacted an object; and responsive to determining that the rotation and deceleration thresholds have been met, providing electrical power to one or more of the plurality of illumination elements.

15. The projectile of claim 14, wherein the deceleration threshold is a 50% reduction in speed or acceleration.

16. A projectile configured to illuminate following a launch event, comprising:

an illumination assembly, the illumination assembly including:

a plurality of illumination elements;

a processor having a sleep state and a working state;

a battery configured to provide electrical power to the processor;

a piezoelectric sensor configured to send a signal to the processor in response to detecting a launch force or acceleration, wherein the signal causes the processor to transition from the sleep state to the working state;

memory including instructions that, when executed by the processor, cause the processor to provide electrical power to one or more of the plurality of illumination elements responsive to a sensor detecting an impact that meets a force threshold, a rotation that meets a threshold rotation value, or an acceleration that meet a threshold acceleration value.

17. The projectile of claim 16, further including an accelerometer wherein the instructions in memory further cause the processor to:

determine whether the accelerometer detects a rotation above a predetermined rotation threshold prior to providing electrical power to one or more of the plurality of illumination elements; and responsive to determining that the rotation threshold has been met, providing electrical power to one or more of the plurality of illumination elements.

18. The projectile of claim 17, wherein the rotation threshold is between 20-100 RPS or 1200-6000 RPM.

19. The projectile of claim 16, further including an accelerometer, wherein the instructions in memory require a detection, by the accelerometer, of a deceleration greater than or equal to a 50% reduction in speed or acceleration before the processor provides power to one or more of the plurality of illumination elements.

20. The projectile of claim 16, wherein the launch force must meet or exceed a value of between 30,000-80,000 G-forces for the piezoelectric sensor to send the signal to the processor.

* * * * *